J. C. Sherwood.
Milk Cooler.

№ 91,372. Patented Jan. 15, 1869.

Witnesses:
John F. Brooks
E. Greene Collins

Inventor:
J. C. Sherwood
Per
Munn & Co.
attorneys

United States Patent Office.

J. C. SHERWOOD, OF WEST CORNWALL, CONNECTICUT.

Letters Patent No. 91,372, dated June 15, 1869.

IMPROVEMENT IN MILK-COOLERS.

The Schedule referred to in these Letters Patent and making part of the same.

*To all whom it may concern:*

Be it known that I, J. C. SHERWOOD, of West Cornwall, in the county of Litchfield, and State of Connecticut, have invented a new and improved Milk-Cooler; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

Figure 1:
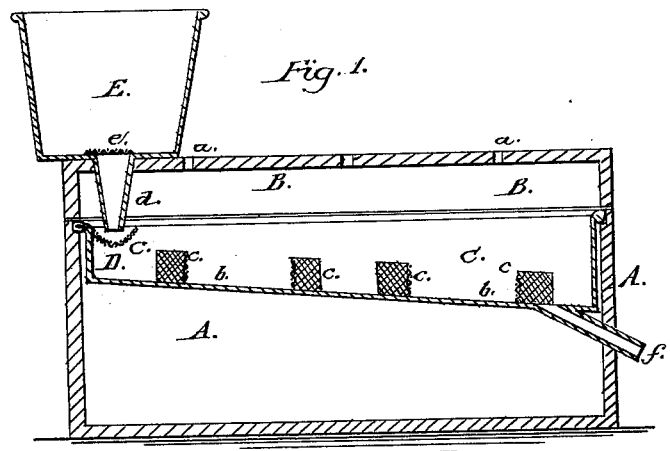
Figure 1 represents a vertical longitudinal section of my improved milk-cooler.
Figure 2:
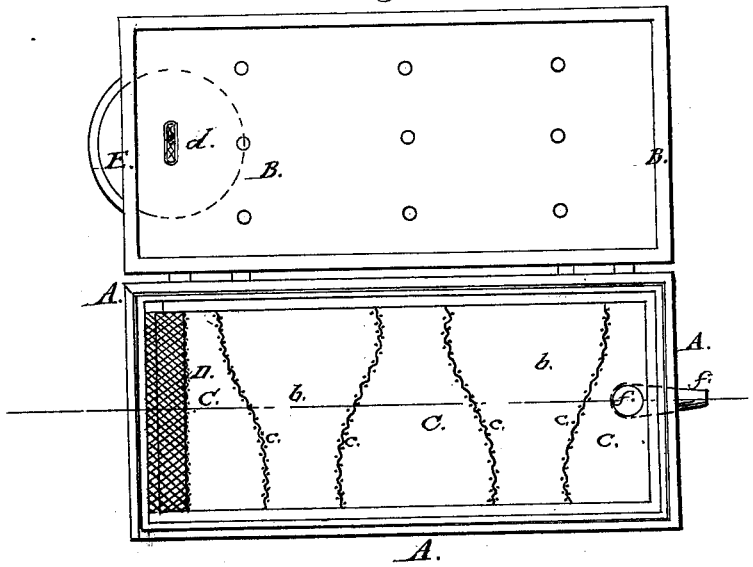
Figure 2 is a plan or top view of the same, showing its hinged corner swung out.

This invention relates to a new apparatus for cooling the milk as it comes from the cow, preparatory to filling the same into cans.

The present invention has for its object to spread the liquid in a thin layer, while it passes over the cooling-surface, so as to obtain quick and reliable action.

The invention consists in the application of an inclined cooling-plate, provided with a series of perforated, transverse projecting plates, by which the milk, as it passes through their apertures, during its downward passage on the cooling-plate, is spread so as to move in a thin sheet over the said plate. It will, therefore, have each particle thoroughly cooled.

A, in the drawing, represents a box or case, of suitable form and size, and provided with a hinged, or removable cover, B, which is perforated at *a a*, to let the evaporation of the milk escape, and to supply the same with fresh air.

In the box A is supported, some distance above the bottom of the same, a vessel, C, fitting the length and width of the box, and provided with an inclined bottom, *b*, as in fig. 1.

Upon the bottom plate *b*, of the vessel, are arranged, at suitable distances from each other, vertical plates, or screws, *c c*, which are perforated with fine holes.

On the upper part of the vessel C is arranged, in the same, a level transverse trough, D, perforated throughout its length.

Above the trough D is arranged, on the cover B, a vessel, E, which has a pipe, *d*, reaching into or above the trough, as shown.

The upper end of the pipe *d* is provided with a strainer, *e*.

A pipe, *f*, reaches from the lower end of the vessel C to the outside.

The box A is to be partly filled with water, or other cooling-matter, *a*, which should, however, not be quite as high as the upper edge of the vessel C, and which cools the bottom of the same.

The milk is poured into the vessel E, and flows through the pipe *d*, into the trough D, it being strained by the plate *c*.

From the trough D, it flows upon the upper part of the cooling-plate *b*, and is arrested by the plates *c c*, which let it pass through in fine streams, so that it will be well spread on the cooling-plate.

The number of plates, *c*, is such that the milk will be so well spread before it reaches the discharge-pipe *f* that it will be thoroughly cooled, or at least deprived of all animal-heat.

Having thus described my invention,

What I claim as new, and desire to secure by Letters Patent, is—

The milk-cooler, consisting of the box A, perforated cover B, vessel E, pipe *d*, strainer *e*, perforated trough D, and cooling-pan C, the latter having the inclined bottom *b*, and the perforated transverse plates *c c*, all combined and operating substantially as herein shown and described.

J. C. SHERWOOD.

Witnesses:
WM. M. SMITH,
R. R. PRATT.